April 14, 1959            M. PAGE            2,881,476

HOLLOW OBJECT MOLDING APPARATUS WITH MOVING HEATERS

Filed Aug. 1, 1955            3 Sheets-Sheet 1

INVENTOR
MARK PAGE
BY Paul S. Marti
ATTORNEY

April 14, 1959                M. PAGE                2,881,476

HOLLOW OBJECT MOLDING APPARATUS WITH MOVING HEATERS

Filed Aug. 1, 1955                      3 Sheets-Sheet 2

INVENTOR
MARK PAGE
BY
ATTORNEY

April 14, 1959 M. PAGE 2,881,476
HOLLOW OBJECT MOLDING APPARATUS WITH MOVING HEATERS
Filed Aug. 1, 1955 3 Sheets-Sheet 3

INVENTOR
MARK PAGE
BY
ATTORNEY

United States Patent Office 2,881,476
Patented Apr. 14, 1959

1

2,881,476

HOLLOW OBJECT MOLDING APPARATUS WITH MOVING HEATERS

Mark Page, Great Neck, N.Y.

Application August 1, 1955, Serial No. 525,448

20 Claims. (Cl. 18—26)

The present invention relates to apparatus for molding hollow articles, and more particularly to apparatus for molding heat-cured polymers.

A number of methods have been proposed heretofore for molding polymers using a mold which is initially charged with a suitable quantity of fluid molding material, closed, then rotated about two mutually perpendicular axes into various positions. The entire inside wall of the mold is thus coated, and, with heat, the material jells, and is cured. The heating of the mold required for curing vinyl polymers, for example, is usually effected in a voluminous furnace large enough to enclose a substantial number of molds together with their supporting mechanisms in all of their multi-rotational positions. The curing process in such an arrangement has been so slow that only a few products per hour has been obtained from any given mold. Furthermore, the nature of the mold support and drive has been such that the process of stripping finished articles from the mold and for charging it for a new cycle has been cumbersome.

An object of the invention is to provide novel, improved molding apparatus, and in particular, novel molding apparatus for heat-cured materials. A further object of the invention is to provide a novel apparatus having a new mode of operation and adapted to utilize a new and effective mold holder, to facilitate removal of the mold from the apparatus for stripping, cleaning, and refilling, without interrupting the machine operation.

In the illustrative embodiments of the invention detailed below, the foregoing and certain additional objects are accomplished, employing apparatus in which a mold is supported for oscillation about a substantially horizontal axis, and the mold is rotated about an axis perpendicular to its axis of oscillation. The oscillation is between extreme positions approximately centered about a horizontal mean. Several rotations of the mold occur during each oscillation. A heater is supported in close proximity to the rotating mold, oscillating with the mold-supporting bed in the preferred embodiment of the invention, thereby eliminating the usual bulky furnace and the resulting limitations in the nature of the mold and in the stripping and recharging thereof.

In the illustrative apparatus, several molds are carried in a removable clamp, which may be manually inserted and removed without interrupting the operation of the machine in which the other clamped molds are undergoing the processing cycle. In a practical application, the machine has a large number of mold clamps, and these will ordinarily be removed from the machine in sequence for stripping the completed products out of the mold and for recharging the mold with molding material, and subsequent renewed insertion into the machine for processing.

The nature of the invention, and further objects and features of novelty and advantage will be clear from the following detailed disclosure of an illustrative embodiment and a modification thereof, shown in the accompanying drawings. In the drawings:

2

Figure 1:
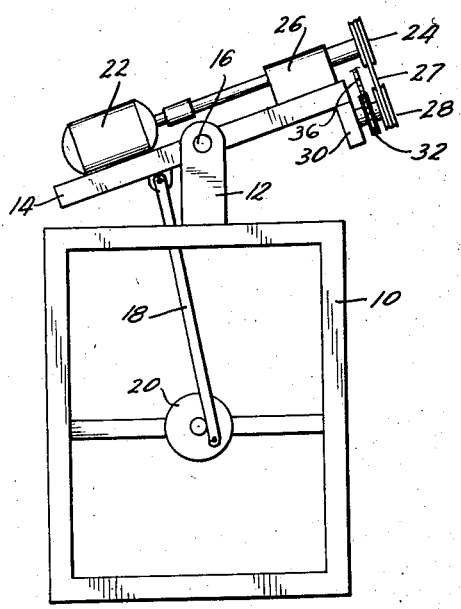
Fig. 1 is an end elevation of an illustrative embodiment of the invention.
Figure 2:
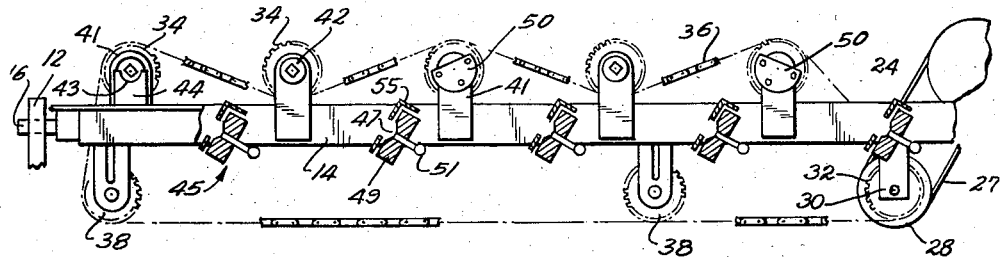
Fig. 2 is a fragmentary cross-section of the apparatus in Fig. 1 generally along the line 2—2 in Fig. 3.
Figure 3:
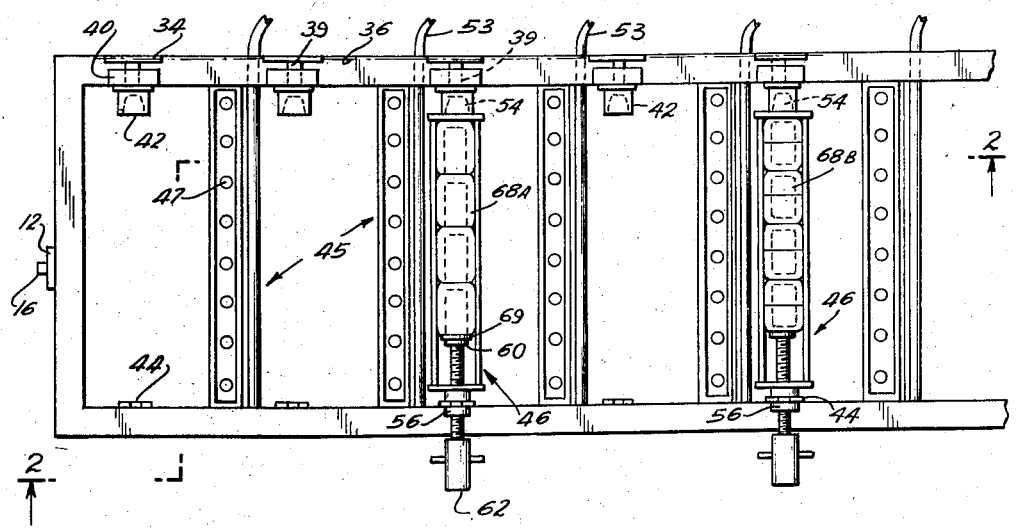
Fig. 3 is a fragmentary view of the apparatus in Fig. 1, as seen from above, perpendicular to bed 14 therein.

Referring now to Fig. 1, there is shown a framed pedestal or base 10 including a support 12 embodying a horizontal bearing 16 for carrying bed 14 for oscillation about a horizontal axis. Only one oscillatory bearing 16 is shown in Fig. 1, a corresponding axially aligned bearing being provided at the opposite end of the machine (Figs. 2 and 3). Bed 14 is oscillated by a link 18 that is driven by crank 20 having a low speed motor drive, not shown.

Bed 14 carries a separate drive motor 22 in the illustrative apparatus which operates pulley 24 through reduction gearing 26. Pulley 24 has a belt 27 that drives a further pulley 28 on a shaft journaled in a depending bearing 30 carried by bed 14. A sprocket 32 that is united to pulley 28 operates a chain 36 for imparting rotary drive to the mold clamps, described below.

It is evident from Fig. 1 that bed 14 oscillates about a horizontal axis, established by bearings 16, and the mean position of this oscillation is horizontal, at least approximately. Bed 14 is oscillated at a relatively low speed, of the order of once every four seconds, whereas the drive mechanism 22 to 30, inclusive, provides a comparatively high-speed rotary drive for the mold clamps, this rotation being several times the frequency of oscillation of bed 14.

As shown in Figs. 2 and 3, bed 14 carried a number of sprockets 34 which are rotated by a common chain 36, operated by drive sprocket 32. Bed 14 additionally includes a number of idler sprockets 38 for guiding and tensioning the chain. Sprockets 34 are carried by shafts 39 in fixed bearings 40 on brackets 41. Each rotary shaft 39 extends through bearing 40, and a drive socket or keyed receptacle 42 is fixed to the opposite end of each shaft. At the opposite edge of bed 14, aligned with keyed receptacles 42, are bearing slots 43 in brackets 44 upstanding from bed 14. These keyed receptacles or sockets 42 and the slotted brackets 44 support the opposite ends of the removable mold clamps, and sockets 42 rotate those mold clamps, as will appear.

Frame 14 has a series of radiant gas heaters 45, including burners 47 and radiant ceramic heat directors 49. The combustible gas mixture reaches burners 47 by a manifold 51, and this manifold is continued to a stationary external source of the gas mixture by flexible hoses 53. As many heaters 45 are provided as there are mold clamp supports 42—44, and these heaters are located generally below and to one side of the position where each mold clamp is supported. Heaters 45 which include the radiant ceramic elements 49, previously mentioned, are fragile and in the event that any mold clamp should accidentally drop, there is a metal guard 55 to protect the burners, and there is a minimum of danger to the heaters because, as shown, the heaters leave a relatively clear path for the mold clamp to drop harmlessly through the frame of bed 14. In any event, there is one heater 45 disposed in close proximity to the position of each mold clamp support and directly opposite the region where the molds are supported.

In Fig. 2, chain 36 is seen to extend about the various sprockets 34 in such manner as to drive certain sprockets clockwise and others counterclockwise in the view, but this is merely a matter of convenience. Significantly, the axis of rotation of each mold as defined by the bearings 40 and 43 is transverse to the oscillatory axis of bed 14 established by bearings 16.

There are as many mold clamps, naturally, as there are companion sockets 42 and bearings 43 on bed 14, but in Fig. 3 only two of the mold clamps are shown in position. An individual mold clamp 46 is drawn to larger scale in Fig. 4. In this figure, three rods 48 are united at their ends to respective plates 50 and 52. Plate 50 has a projecting generally square member 54 that serves as a keyed drive element. There is a taper to the side faces of this member 54, so that a cross-section taken parallel to plate 50 would be a large square near plate 50, whereas the cross-section taken at a plane further removed from plate 50 would be a smaller square. Member 54 has a sharply tapered end 55. The socket 42 is roughly complementary to this tapered keyed drive element 54. Because of the tapers described, the insertion of any keyed drive element 54 into socket 42 is a very easy operation, even with the machine in operation. As the member 54 enters socket 42, the rotary drive picks up the mold clamp and enforces rotation.

At the end of the mold clamp opposite key 54, an internally threaded bearing member 56 is united to plate 52. Screw 58 operates in this threaded bearing. The left hand end of screw 58 (Fig. 4) carries swivel pressure plate 60 and handle 62 is fixed to screw 58 at its right hand. Handle 62 is round for the most part, and has a cross bar 64 to aid in the tightening swivel head 60 against molds in the clamp. Handle 62 is round in cross-section so that, when drive member 54 enters its driving socket 42, at a time when the mold clamp is manually supported by the machine attendant, there is no difficulty about the mold clamp starting freely in rotation.

Figure 4:
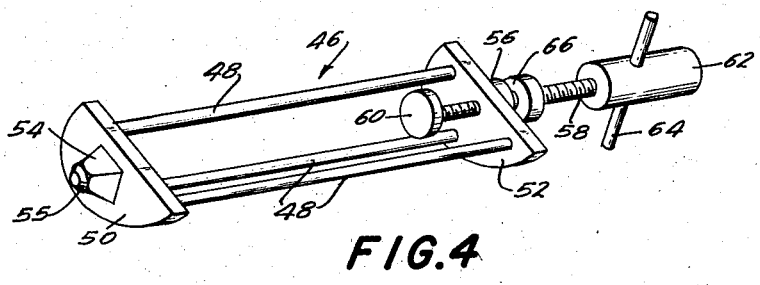
Fig. 4 is a view of the mold clamp forming part of the apparatus in Figs. 1-3, this mold clamp being drawn to larger scale than Figs. 1, 2, and 3.

In Fig. 4, member 56 is seen to have a groove 66, that is, an encircling groove 66, which groove receives plate 44. This plate is formed with upwardly open notch 43 seen at the left in Fig. 2, to receive the deposited mold clamp. Two mold clamps are shown in Fig. 3 in operative relation with the drive member 54 of the clamp in driving socket 42 of the bed, and with notched plate 44 in groove 66. Plate 44 prevents the mold clamp from moving downward in Fig. 3, thereby retaining keyed drive member 54 in its supporting and driving socket 42. In this position of assembly, mold clamp 46 is supported physically, and it is also rotated as a spindle about its own longitudinal axis through members 54 and 56, while at the same time it is readily removable from the machine. Removal is effected simply by lifting handle 62 of the mold clamp and withdrawing member 54 from socket 42.

Figure 5:
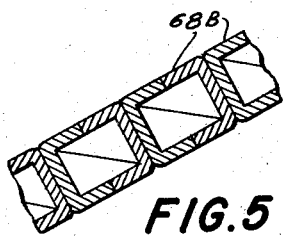
Figs. 5 and 6 are fragmentary cross-sectional views of typical molds at different phases of their processing cycle in the apparatus of Figs. 1-4, inclusive.

As seen in Fig. 3, a number of molds are shown, stacked one against the other. These molds 68 assume a number of different forms and it is a feature of this invention that different forms of molds may be handled concurrently. In the form of Fig. 3, each mold 68A is simply a body having a hollow of the desired contour and having an open end which in the illustration faces handle 62 of the mold clamp. Each mold opening is closed off by the abutting face of the next mold, except that the lowermost mold in Fig. 3 is closed off by an end plate 69. Another form of mold 68B appears to the right in Fig. 3 and in Figs. 5 and 6 which illustrate the molding process effected during operation of the apparatus.

Disregarding the particular form of mold used, whether the one-part mold 68A or the two-part mold 68B, the process is commenced by charging the molds with a measured quantity of molding material, advantageously vinyl plastic. The molds are assembled in mold clamp or spindle 46 with the mold cavities closed off as shown. After screw 58 has been tightened with the aid of lever 64, the molds which at this stage are charged with molding material, closed, stacked and clamped, are inserted with clamp or spindle 46 in operating position in the machine. This mold clamp or spindle is normally inserted during the time that the other molds in adjacent positions are being processed. During this insertion of the spindle the rotary drive of all of the sockets 42 and the oscillatory drive of bed 14 are sustained.

Figure 6:
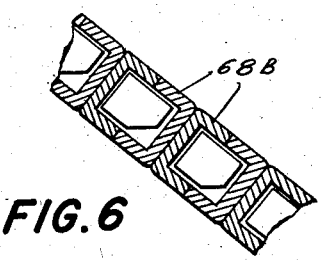

At the same time that the operator deposits the charged mold clamp or spindle into position for processing, a control button for an automatically timed valve (not shown) is operated, increasing the flow of combustion gas to the set of burners opposite the newly inserted mold clamp or spindle. The flow of gas is automatically reduced to pilot-flame level at the end of a predetermined time interval. This time interval has been found greatly reduced in the novel processing treatment of vinyl plastics with exceptional success. A 1½-minute cycle yields products of excellent quality and affords good control and uniformity of the molded products. At the start of the cycle, the molds are warm, but not too hot to be handled. The fluid charge may assume the configuration in Fig. 5 with perhaps a slight coating of material about the inside walls of the molds. As the molds heat up, and during the rotation and oscillation of the molds, all of the walls are coated with progressively increasing thickness of material until the entire charge has been distributed over the walls of the molds, where it is jelled and cured. The distribution of the material on the walls is illustrated in Fig. 6 at an intermediate stage of this phase. The angle of oscillation is chosen to be adequate to insure coating of the mold walls. Oscillating the mold spindle approximately 35° above and below the horizontal mean position has been found quite satisfactory.

After the preset time interval for the molding cycle has ended, and the gas is cut back to a low level leaving only a pilot burning, the mold clamp is removed by grasping handle 62 and lifting member 56 away from slotted plate 44, and in the same motion removing driving member 54 from keyed drive socket 42 of the bed. This is done without interrupting the oscillation of bed 14 or the rotation of the other mold spindles carried by the bed 14. The molds of other spindles are ordinarily at different stages of their molding cycles. The attendant who removes a mold clamp will thereupon substitute another mold clamp with charged molds, and initiate a new processing cycle. In this way the five positions illustrated in bed 14 for mold spindles can be at five different phases of their molding cycle (larger numbers of spindles can be handled in larger machines) and the mold spindles can be removed in sequence, and in the same sequence new molding cycles are started. The spindles are taken from the machine and cooled, the molds are released from the clamps and then opened, and the completed products are stripped out of the molds. The empty molds are then cleaned and recharged with molding material, in readiness for treatment in the machine. These operations of cooling, stripping, cleaning and refilling of the molds are all done away from the machine, as a result of the ready removability and reinsertion of the mold clamps. Accordingly, the machine is not complicated by provision for such preparatory and finishing operations. The removability of the mold spindles, and their retention in operative position in the machine, are made possible by the nature of the mold-handling operations in the machine (oscillating and rotating) which distribute the molding material over the mold walls and distribute the curing heat. The attendant of the machine can proceed in orderly, continuous operations in dealing with all the mold spindles successively, without interrupting the machine operation and without loss of processing time.

Figure 7:
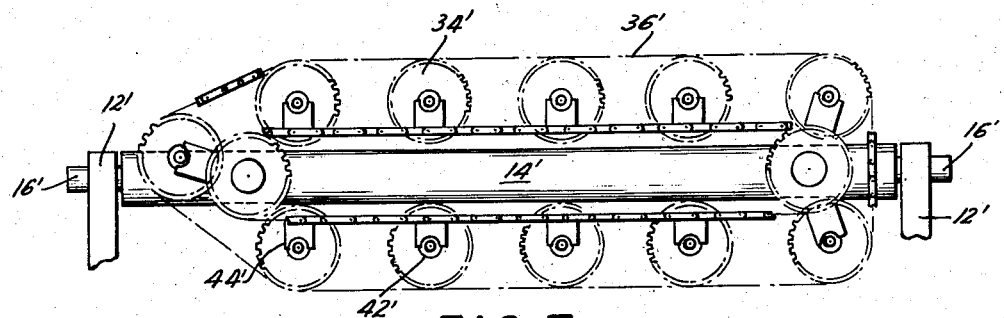
Fig. 7 is an end elevation similar to Fig. 2 of a modification of the apparatus in Figs. 2 and 3.
Figure 9:
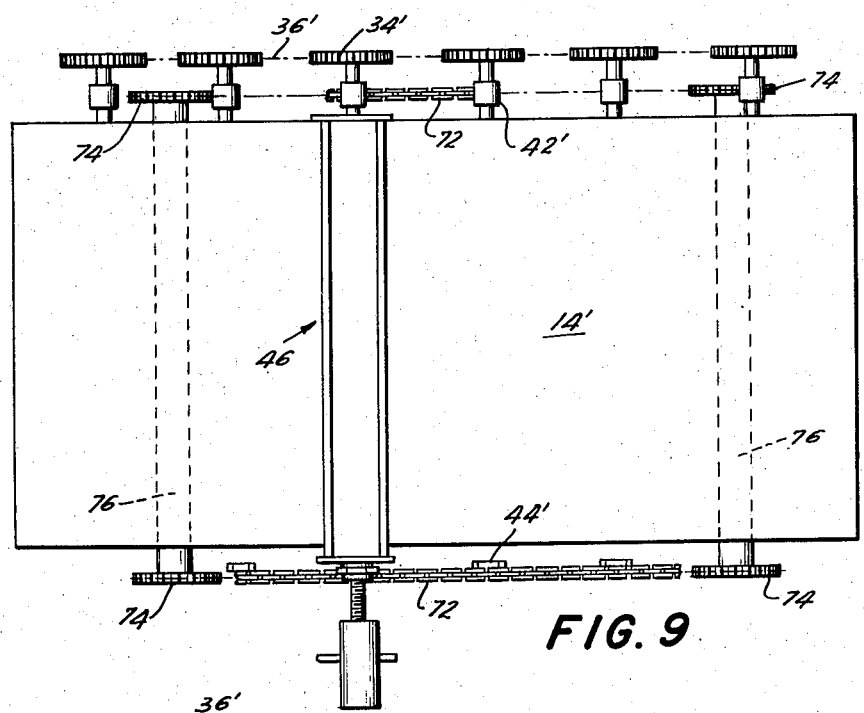
Fig. 9 is a fragmentary plan view of the apparatus in Fig. 7.
Figure 8:
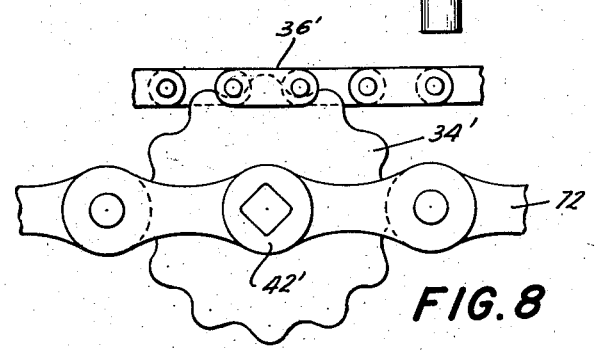
Fig. 8 is a fragmentary view of a detail in Fig. 7 drawn to enlarged scale.

The embodiment of Figs. 7, 8 and 9 is of basically similar design to that described above and illustrated in Figs. 1–6. Description thereof is not repeated, but primed numerals are used in Figs. 7, 8 and 9 corresponding to like elements in Figs. 1–6. Heaters (not shown) are distributed along bed 14'. In this embodiment, the molds in their clamps or spindles rotate about the spindle axis as will appear, and the axes of the spindles oscillate above and below a horizontal mean with the oscillation of bed 14'. Additionally, chain conveyors transport spindle sockets 42' and bearing brackets 44' in the axial alignment shown. Chain 72 (see Fig. 8) embodies a suitable rotary support for spindle socket 42' (like bearing 40, Fig. 3) and a drive sprocket 34' is furnished for driving each socket 42'. A further chain 36' is arranged along the series of sprocket 34', in a manner similar to the chain 36, and drives sprockets 34' to rotate the mold clamps or spindles 46 several rotations for each cycle of oscillation. The same form of mold clamp or spindle is used in this modification as appears in Fig. 4.

This devices operates in the same manner as the previous apparatus, but has certain advantages to justify its additional driving and conveyor chains that were not used in the first-described machine. The apparatus of Fig. 7 can be charged with spindles at the extreme left-hand end and the spindles can be manually or mechanically removed, or simply discharged, from the right-hand end of the machine, and the timing of the molding cycle can be controlled not by turning the gas on and off as in the apparatus of Figs. 1–3, but in this instance the molding cycle can be established by the time of transit of any given mold from the left-hand end of the machine to the right-hand end, this speed of travel being adjusted for the proper processing time. In the latter machine, different heating at different times in the processing cycle can readily be achieved, if desired, as by setting the heaters distributed along the bed 14' at proper adjustments.

Two forms of molding apparatus have been shown, which produce hollow molded products, and in each process the entire charge of the mold is utilized in the finished product. This type of process avoids contaminating the supply of mateiral such as might occur if the molds were filled for coating their walls with material and if the excess material were poured back into the supply.

The two motions described in connection with both forms of apparatus, namely the rotation of the mold and spindles about one axis, and the oscillation of the spindles so that the rotational axis moves between oscillatory extremes with a horizontal mean position, are effective to distribute the molding material with a remarkable degree of uniformity over the inside wall of the mold. The process of charging molds with material and assembling the molds is accomplished outside the apparatus and this is of considerable advantage in operating the machine and in minimizing the time cycle of the machine without losing control over product uniformity and consistent curing. The machine is also of special advantage insofar as the type of heating used is concerned. In contrast to some apparatus where a huge enclosed space is required for furnishing the processing heat, and in contrast to other types of apparatus where the molds are heated by built-in electrical heaters, the present apparatus achieves all that is required by a far less expensive and more compact type of heater as described. It should be understood that the gas heaters are excellent, but are illustrative; electric heaters may be used in place of the gas heaters without in any way departing from the spirit of the invention, and electronic induction heat may also be used.

A substantially greater number of mold spindles are employed in the process, practically, than those actually in the machine. This is significant, for the machine is no larger than is needed for the jelling and curing process.

What I claim is:

1. Apparatus for molding hollow products, including means for supporting a mold for rotation about a first axis, means for rotating the mold about that axis, means for moving the mold supporting means cyclically about an axis transverse to the first axis, a heater mounted adjacent to a mold carried by said mold supporting means but said heater being mounted separate from the mold and separate from said mold supporting means and fixed against rotation about the first-mentioned axis, the mounting of the heater being arranged for cyclically moving the heater with the mold about said transverse axis, whereby the mold is rotated about said first axis without requiring rotation of the heater therewith.

2. Apparatus for molding hollow products, including rotary bearing means for removably supporting a mold for rotation about an axis and drive means for rotating the mold about that axis, means for cyclically moving said bearing means so as to change the slope of the rotational axis for distributing fluid molding material over the inside walls of the mold during rotation thereof, a heater and means supporting the heater for cyclic movement with said bearing means and adjacent to but separate from said mold and said rotary bearing means and fixed against rotation about the first-mentioned axis, whereby the heater is maintained adjacent to the mold during the rotation and cyclic motion of the mold without the heater being constrained to rotate with the mold about said axis and whereby the mold may be removed without removal of the heater.

3. Apparatus for molding hollow products, including means for rotating a mold about a first axis, means for moving the mold cyclically about an axis transverse to said first axis, a heater mounted for cyclic movement with the mold and adjacent to but separate from the mold and from the mold rotating means and fixed against rotation about the first-mentioned axis, whereby the heater remains adjacent the cyclically moving mold without rotating with the mold about said first axis.

4. Apparatus for molding hollow objects, including means for removably supporting a mold, means for continuously rotating the mold about a first axis, a heater mounted closely adjacent to said mold supporting means and adjacent to but separate from a mold carried by said mold supporting means, and means for oscillating the mold together with said heater so that the axis of rotation of the mold moves between extreme positions that have a substantially horizontal mean and said heater maintains a constant relationship to the axis of the mold, whereby the heater is neither constrained to rotate with the mold nor is it constrained to be removed from the apparatus when the mold is removed.

5. Apparatus for molding hollow products including a mold, means for continuously rotating the mold about a first axis, and means for oscillating the mold so that its axis of rotation moves between extreme positions above and below a horizontal mean, and a heater separately mounted adjacent said mold and mounted for oscillation therewith.

6. Apparatus for molding hollow products, including a bed, a heater carried by said bed, means for oscillating the bed about a horizontal axis between extreme positions above and below a horizontal mean, means supporting a mold adjacent said heating means, said supporting means being mounted on said bed and having rotary bearings, the axis of said bearings being arranged transverse of the axis of oscillation of said bed to oscillate therewith, and drive means for rotating the molds during their oscillation.

7. Molding apparatus, including a base, a bed carried by said base on horizontally extending bearings for oscillation, a low frequency oscillatory drive for said bed arranged to drive the bed between extreme positions above and below a horizontal mean position, a plurality of pairs of rotary bearings carried by said bed, each pair of bearings having a common axis extending transverse to the axis of oscillation, mold-carrying spindles removably supported in said bearings, rotary drive means for said spindles having a high rotational speed compared to the frequency of said oscillatory drive, and heating means carried by said bed adjacent the position of molds carried by said spindles.

8. Molding apparatus for hollow plastic products, including at least one mold, a clamp for said mold having a keyed fitting projecting at one end thereof, and a grooved bearing at the other end thereof, a frame for supporting said clamp including a mating fitting for said keyed projecting fitting at one position, and a fork for the grooved bearing at a position spaced from said keyed fitting, means for rotating the mold including a rotary drive for said keyed fitting carried by said bed, heating means carried by said bed adjacent the position of the supported mold, and an oscillatory support and drive means for said bed with the axis of oscillation extending transverse of the rotational axis of the molds, and with the oscillation having extreme positions above and below a substantially horizontal mean position.

9. Apparatus for molding hollow products, including a bed, a heater carried by said bed, means for oscillating the bed about a horizontal axis between extreme positions above and below a horizontal mean, means supporting a mold adjacent said heating means, said supporting means being mounted on said bed and having rotary bearings, the axis of said bearings being arranged transverse of the axis of said bed to oscillate therewith, drive means for rotating the molds during oscillation of the bed and during oscillation of the molds with the bed, and means for transporting said rotary bearings along the bed, in a direction parallel to the axis of oscillation thereof.

10. Apparatus for molding hollow products, including a bed, means for oscillating the bed about a horizontal axis between extreme positions above and below a horizontal mean, means supporting a mold on the oscillatory bed, said supporting means including rotary bearings, the axis of said bearings being arranged transversely of the axis of the bed to oscillate therewith, drive means for continuously rotating the molds during oscillation of the bed, and means for transporting the rotary bearings along a path parallel to the axis of oscillation of the bed.

11. Apparatus in accordance with claim 10, including a removable mold support having a keyed fitting, said rotary drive means having a complementary fitting to establish a mechanical drive connection from the mold support to the rotary drive means, and said mold support having a groove-and-yoke connection preventing accidental separation of said keyed fittings.

12. Apparatus for molding hollow products including a bed, means for oscillating the bed about a horizontal axis between extreme positions above and below a horizontal mean, means for supporting a series of molds at spaced positions along said bed, said supporting means including a series of pairs of readily removable mold clamping spindles, rotary bearings for said spindles, the axes of the axis of oscillation of the bearings being parallel and transverse of the bed and arranged to oscillate therewith, and drive means for rotating the mold supporting means continuously.

13. Apparatus in accordance with claim 12, including means for transporting said pairs of bearings along said bed in a direction parallel to the axis of oscillation of the bed.

14. Apparatus for molding hollow products including a bed, means for oscillating a bed about an axis, a plurality of mold-carrying spindles, rotary bearings carried by said oscillatory bed removably supporting said spindles with their axes parallel and transverse to the oscillatory axis of the bed, rotary spindle drive means on said bed, the rotary axes of said bearings being arranged to oscillate the spindle axes above and below a horizontal mean, and heating means carried by the bed for oscillation therewith and supported closely adjacent to but separate from the molds carried by the respective spindles.

15. Molding apparatus according to claim 14, wherein said rotary bearings are fixed to said bed.

16. Molding apparatus according to claim 14 wherein conveyors are provided for moving said bearings along the bed.

17. Apparatus for molding hollow products including a plurality of molds, a plurality of spindles each embodying a mold clamp for holding molds therein, an oscillatory bed, said bed having an axis of oscillation and having spindle-supporting and rotating means for carrying multiple spindles with their axes transverse of the oscillatory axis of the bed and arranged to oscillate above and below a horizontal mean, drive means carried by the bed and effective when a spindle is mounted thereon to rotate each spindle continuously about its axis, and heaters distributed along said bed closely adjacent to but separate from said molds and spindles.

18. Molding apparatus in accordance with claim 17 wherein said spindle supporting and rotating means are stationary on the bed and wherein an individual heater is associated with each supported spindle.

19. Apparatus for molding hollow products including a bed, means for oscillating the bed about a horizontal axis between extreme positions above and below a horizontal mean, means for supporting a series of molds at spaced positions along said bed, said supporting means including a series of pairs of rotary bearings, the axes of the pairs of bearings being parallel and transverse to the oscillatory axis of the bed and arranged to oscillate therewith above and below a horizontal mean, drive means for rotating the mold supporting means continuously, a series of individual heaters distributed along the bed adjacent said mold supporting means, and means for transporting said pairs of bearings along said bed in a direction parallel to the axis of oscillation of the bed.

20. Apparatus in accordance with claim 19 including a series of mold-clamping spindles having a separable keyed drive connection to each said rotating drive means.

References Cited in the file of this patent
UNITED STATES PATENTS

| | | |
|---|---|---|
| 1,812,242 | Jensen | June 30, 1931 |
| 2,169,281 | Pfanstiehl | Aug. 15, 1939 |
| 2,469,892 | Rempel | May 10, 1949 |
| 2,610,041 | Stahl | Sept. 9, 1952 |
| 2,659,107 | De Bell | Nov. 17, 1953 |